United States Patent
Pang et al.

(10) Patent No.: US 8,547,205 B2
(45) Date of Patent: Oct. 1, 2013

(54) ANONYMOUS AUTHENTICATION METHOD BASED ON PRE-SHARED CIPHER KEY, READER-WRITER, ELECTRONIC TAG AND SYSTEM THEREOF

(75) Inventors: Liaojun Pang, Shaanxi (CN); Manxia Tie, Shaanxi (CN); Xiaolong Lai, Shaanxi (CN); Zhenhai Huang, Shaanxi (CN)

(73) Assignee: China IWNCOMM Co., Ltd., Xi'an (CN)

( * ) Notice: Subject to any disclaimer, the term of this patent is extended or adjusted under 35 U.S.C. 154(b) by 326 days.

(21) Appl. No.: 13/056,856

(22) PCT Filed: Jul. 28, 2009

(86) PCT No.: PCT/CN2009/072954
§ 371 (c)(1),
(2), (4) Date: Jan. 31, 2011

(87) PCT Pub. No.: WO2010/012220
PCT Pub. Date: Feb. 4, 2010

(65) Prior Publication Data
US 2011/0133883 A1  Jun. 9, 2011

(30) Foreign Application Priority Data
Aug. 1, 2008  (CN) .......................... 2008 1 0150525

(51) Int. Cl.
*G05B 19/00* (2006.01)
*H04Q 5/22* (2006.01)
(52) U.S. Cl.
USPC ........................... 340/5.8; 340/10.1; 340/10.4
(58) Field of Classification Search
USPC ................. 340/5.1, 5.2, 5.8, 5.86, 10.1, 10.5, 340/10.51, 10.3, 10.4, 10.41, 572.1, 572.8, 340/568.1, 540, 500; 713/180, 168, 161, 713/153, 177, 189, 193; 380/273, 270, 255, 380/277, 44; 726/27, 29, 2, 3, 26, 17
See application file for complete search history.

(56) References Cited

U.S. PATENT DOCUMENTS 7,606,557 B2 * 10/2009 Park et al. .................... 455/410
2007/0043945 A1   2/2007 Choi et al.
(Continued)

FOREIGN PATENT DOCUMENTS

CN        1534935     10/2004
CN      101329720     12/2008
(Continued)

OTHER PUBLICATIONS

Korean Notice of Allowance regarding Application No. 10-2011-7004377, dated Dec. 21, 2012. Translation provided by Unitalen Attorneys at Law.
Sheng-lin Zhu et al. RFID Protocols and Their Security. College of Information, South China Agriculture University, Guangzhou Guangdong 510642, China. Jun. 15, 2007.
(Continued)

*Primary Examiner* — Daniel Wu
*Assistant Examiner* — Mancil Littlejohn
(74) *Attorney, Agent, or Firm* — Harness, Dickey & Pierce, P.L.C.

(57) ABSTRACT

An anonymous authentication method based on a pre-shared key, a reader-writer, an electronic tag and an anonymous bidirectional authentication system are disclosed. The method comprises the following steps: 1) a reader-writer sends an accessing authentication requirement group to the electronic tag; 2) after the electronic tag receives the accessing authentication requirement group, an accessing authentication response group is constructed and sent to the reader-writer; 3) after the reader-writer receives the accessing authentication response group, an accessing authentication confirmation group is constructed and sent to the electronic tag; 4) the electronic tag carries out confirmation according to the accessing authentication confirmation group.

20 Claims, 3 Drawing Sheets

(56) References Cited

U.S. PATENT DOCUMENTS

2008/0001724 A1* 1/2008 Soleimani et al. ......... 340/10.51
2008/0123852 A1 5/2008 Jiang
2008/0155657 A1 6/2008 Ogura et al.

FOREIGN PATENT DOCUMENTS

| JP | 2005348306 A | 12/2005 |
| JP | 2008015639 A | 1/2008 |
| KR | 20070021898 A | 2/2007 |
| KR | 20080052088 A | 6/2008 |
| WO | WO-2006/075146 A1 | 7/2006 |
| WO | WO-2006075150 A1 | 7/2006 |

OTHER PUBLICATIONS

Extended European Search Report regarding Application No. 09802413.6-2415 / 2320348, dated May 22, 2012.

Benoît Calmels et al. "Low-Cost Cryptography for Privacy in RFID Systems." France Telecom R&D. *Smart Card Research and Advanced Applications Lecture Notes in Computer Science*. $7^{th}$ IFIP WG 8.8/11.2 International Conference, CARDIS 2006, Tarragona, Spain. Apr. 19-21, 2006. Proceedings.

A. Menezes et al. "Hash Functions and Data Integrity." *Handbook of Applied Cryptography*, Chapter 9. 1997.

A. Menezes et al. "Key Establishment Protocols." *Handbook of Applied Cryptography*, Chapter 12. 1997.

* cited by examiner

ANONYMOUS AUTHENTICATION METHOD BASED ON PRE-SHARED CIPHER KEY, READER-WRITER, ELECTRONIC TAG AND SYSTEM THEREOF

CROSS-REFERENCE TO RELATED APPLICATIONS

This application is a 371 U.S. National Stacie of International Application No. PCT/CN2009/072954, filed Jul. 28, 2009. This application claims priority to Chinese patent application No. 200810150525.8 filed with the State Intellectual Property Office on Aug. 1, 2008 and titled "Pre-shared Key Based Two-way Anonymous Authentication Method", which is herein incorporated by reference in its entirety.

This application claims priority to Chinese patent application No. 200810150525.8 filed with the State Intellectual Property Office on Aug. 1, 2008 and titled "Pre-shared Key Based Two-way Anonymous Authentication Method", which is herein incorporated by reference in its entirety.

FIELD OF THE INVENTION

The present invention relates to a pre-shared key based anonymous authentication method, reader-writer, electronic tag and a pre-shared key based two-way anonymous authentication system.

BACKGROUND OF THE INVENTION

Security concerns of wireless networks such as WLANs (Wireless Local Area Networks) and WMANs (Wireless Metropolitan Access Networks) are more serious than those of wired Ethernet networks. RFID (Radio-frequency identification) faces the same challenges. Identity authentication and permission authorization between the reader-writer and the electronic tag must be effectively dealt with prior to secure communication. Among all the wireless networks, electronic tags have the most complicated security matter, because of their huge differences in performances and functions, and the difficulties to normalize their product forms and application requirements. As a result, security strategies must be tailored to each type of electronic tag and its particular application mode.

Generally, according to their application situations and environments, electronic tags can be classified as: 1) high-grade electronic tags, readable and writable, having a certain amount of memory space, and capable of data processing and computing; 2) middle-grade electronic tags, with a performance slightly poorer than the high-grade ones and similar functions; 3) low-grade electronic tags, only for recording some data information and supporting information to be read from or write to by a reader-writer, and generally incapable of data processing and computing.

For electronic tags with a high performance and certain computing and processing capabilities, existing secure access protocols for wireless networks can be used or adopted in the two-way authentication and permission authorization between the electronic tag and the reader-writer, for example, WAPI (WLAN Authentication and Privacy Infrastructure). However, for electronic tags with a low performance, existing protocols are not supported, and a new security protocol is to be developed for their security.

Particularly, for ISO (International Organization for Standardization) 18000-6 type A and ISO 18000-6 type B electronic tags, which have poor computing and processing performances, conventional public-key based security protocols are not applicable. However, studies have shown that these types of electronic tags can fully support pre-shared key based security protocols. Therefore, pre-shared key based security protocols are an effective solution to the security of 18000-6 type A and ISO 18000-6 type B electronic tags.

Moreover, it should be noted that, in its field of application, the ID (identity) of an electronic tag normally indicates a business secret, e.g. price or place of origin of a product; hence, we must maintain its secrecy during authentication. In order to avoid ID leaks and subsequent attacks, a publicable temporary identity replacing the ID itself is used in the protocol. For security sake, an electronic tag may have different temporary identities in different authentication processes.

Some pre-shared key based two-way authentication protocols have been proposed in the art. However, those protocols have security problems and cannot achieve the purpose of security authentication. Specifically, the security problems of existing protocols include:

1. Shared-key updating brings security risks. Because the security of the shared-key is the foundation of a pre-shared key based security protocol, the shared-key is normally written in a reliable and manual manner; and dynamically updating it in the protocol will inevitably introduce unsafe or unreliable matters, hence deteriorating the security of the system.

2. Frequent shared-key writing causes the system to lose a lot energy, which may further deteriorates the usability of the electronic tag, as its performance is sensitive to the energy.

3. CRC (Cyclic Redundancy Check) is used for integrity check of messages of the protocol, and calculation of integrity check codes does not involve any secret information shared between both parties of the communication and cannot defend against active attacks.

4. Shared key updating does not have forward secrecy. If the attacker cracks one of the updated keys, he will be able to calculate all the shared keys negotiated in the future.

5. Shared key updating does not have backward secrecy. If the attacker cracks one of the updated keys, he will be able to calculate all the shared keys negotiated in the past.

6. Both parties of the protocol must store each calculation of message integrity check information, which raises the burden on system storage.

Due to the foregoing concerns, a new pre-shared key based two-way anonymous authentication protocol for two-way authentication and permission authorization between the electronic tag and the reader-writer is desired, to guarantee the security of data information of these types of electronic tags.

SUMMARY OF THE INVENTION

To solve the security problems in existing authentication protocols in the field of electronic tags, the invention provides a pre-shared key based anonymous authentication method, reader-writer, electronic tag and a pre-shared key based two-way anonymous authentication system.

The technical solution of the invention includes: a pre-shared key based anonymous authentication method, including:

sending, by a reader-writer to an electronic tag, an access authentication request packet, wherein the access authentication request packet includes: a random number N1 selected by the reader-writer;

authenticating, by the reader-writer, an access authentication response packet after receiving the access authentication response packet sent from the electronic tag, and building an access authentication confirmation packet if the authentication succeeds, wherein the access authentication response packet includes: a temporary identity TempID of the electronic tag; the random number N1 selected by the reader-writer; a random number N2 selected by the electronic tag; and a message integrity check code MIC calculated by the electronic tag and having the value H (TempID||N1||N2||Key);

sending, by the reader-writer to the electronic tag, the access authentication confirmation packet.

Preferably, the method further includes:

authenticating, by the electronic tag, the access authentication request packet after receiving the access authentication request packet sent from the reader-writer, and building the access authentication response packet if the authentication succeeds, wherein the access authentication response packet includes: the temporary identity TempID of the electronic tag; the random number N1 selected by the reader-writer; the random number N2 selected by the electronic tag; and the message integrity check code MIC calculated by the electronic tag and having the value H (TempID||N1||N2||Key);

sending, by the electronic tag to the reader-writer, the access authentication response packet;

confirming, by the electronic tag, the received access authentication confirmation packet sent from the reader-writer.

Preferably, the method further includes, before the reader-writer sends to the electronic tag the access authentication request packet:

setting up, by the reader-writer, system parameters for the electronic tag, and initializing the system parameters and sending the system parameters to the electronic tag which stores the system parameters.

Preferably, system parameters in the electronic tag includes: an identity ID of the electronic tag, the pre-shared key Key and the temporary identity TempID of the electronic tag, wherein TempID is initialized as: TempID=H (ID||Key);

system parameters in the reader-writer includes: all information of the electronic tag including: TempID, a temporary identity LastTempID of the electronic tag from the last authentication, ID, Key and private information data PData of the electronic tag, wherein TempID is initialized as: TempID=H (ID||Key), and LastTempID is initialized as: LastTempID=TempID.

Preferably, the authenticating of the access authentication response packet and the building of the access authentication confirmation packet if the authentication succeeds include:

if the reader-writer determines that N1 is the random number selected by itself, then recalculates MIC and compares its value with the received MIC, if they are equal, then searches a back-end database, if a temporary identity TempID of the electronic tag that equals to the received TempID is found, then let LastTempID=TempID and TempID=H (ID||Key||N1||N2), determines that the authentication succeeds, builds the access authentication confirmation packet and sends it to the electronic tag; and if a temporary identity TempID of some electronic tag that equals to the received TempID cannot be found, then continues to search whether LastTempID that equals to the received TempID exists, if LastTempID of some electronic tag that equals to the received TempID is found, then let TempID=H (ID||Key||N1||N2), determines that the authentication succeeds, builds the access authentication confirmation packet and sends it to the electronic tag.

Preferably, the access authentication confirmation packet includes: the random number N2 selected by the electronic tag; and a message integrity check code MIC1 calculated by the reader-writer and having the value H (N2||Key).

Preferably, the authenticating of the access authentication request packet and the building of the access authentication response packet if the authentication succeeds include:

if the electronic tag determines that N2 is the random number selected by itself, then recalculates MIC1 and compares its value with the received MIC1, if they are equal, then let TempID=H (ID||Key||N1||N2) and determines the authentication succeeds.

Preferably, the authentication function of the reader-writer is carried out by a back-end server instead.

Correspondingly, the invention provides a reader-writer, including:

a sending unit, adapted to send to an electronic tag an access authentication request packet, wherein the access authentication request packet includes: a random number N1 selected by the reader-writer;

a reception unit, adapted to receive an access authentication response packet sent from the electronic tag, wherein the access authentication response packet includes: a temporary identity TempID of the electronic tag; the random number N1 selected by the reader-writer; a random number N2 selected by the electronic tag; and a message integrity check code MIC calculated by the electronic tag and having the value H (TempID||N1||N2||Key);

an authentication unit, adapted to authenticate the access authentication response packet received by the reception unit, and send an authentication success result;

a building unit, adapted to build an access authentication confirmation packet on receipt of the authentication success result, and send to the electronic tag the access authentication confirmation packet.

Preferably, the reader-writer further includes:

a setting-up unit, adapted to set up system parameters for the electronic tag, and initialize the system parameters and send the system parameters to the electronic tag which stores the system parameters.

Preferably, the authentication unit includes:

a determination unit, adapted to determine whether N1 is the random number selected by itself, and send a positive determination result;

a comparing unit, adapted to, on receipt of the positive determination result sent from the determination unit, recalculate MIC and compares its value with the received MIC, and send a result indicating they are equal;

a search unit, adapted to, on receipt of the result indicating they are equal, if can find a temporary identity TempID of the electronic tag that equals to the received TempID, then let LastTempID=TempID and TempID=H (ID||Key||N1||N2), and send an authentication success result;

a building unit, adapted to, on receipt of the authentication success result, build the access authentication confirmation packet and send to the electronic tag the access authentication confirmation packet.

Correspondingly, the invention provides an electronic tag, including:

an authentication unit, adapted to receive an access authentication request packet sent from a reader-writer, authenticate the access authentication request packet, and send an authentication success message;

a building unit, adapted to, on receipt of the authentication success message sent from the authentication unit, build an access authentication response packet, and send to the reader-writer the access authentication response packet;

a reception unit, adapted to receive an access authentication confirmation packet sent from the reader-writer, wherein the access authentication confirmation packet includes: a random number N2 selected by the electronic tag; and a message integrity check code MIC1 calculated by the reader-writer and having the value H (N2||Key);

a confirmation unit, adapted to confirm the access authentication confirmation packet received by the reception unit.

Preferably, the electronic tag further includes:

a storage unit, adapted to store in advance received system parameters sent from the reader-writer.

Preferably, the confirmation unit includes:

a determination unit, adapted to determine whether N2 is the random number selected by itself, and send a positive determination result;

a comparing unit, adapted to, on receipt of the positive determination result, recalculate MIC1 and compares its value with the received MIC1, and send a result indicating they are equal;

a confirmation unit, adapted to, on receipt of the result indicating they are equal, let TempID=H (ID||Key||N1||N2) and determines the authentication succeeds.

Correspondingly, the invention provides a pre-shared key based two-way anonymous authentication system, including a reader-writer and an electronic tag:

wherein the reader-writer is adapted to send to the electronic tag an access authentication request packet, wherein the access authentication request packet includes: a random number N1 selected by the reader-writer; authenticate an access authentication response packet after receiving the access authentication response packet sent from the electronic tag, and build an access authentication confirmation packet if the authentication succeeds; and send to the electronic tag the access authentication confirmation packet, wherein the access authentication confirmation packet includes: a random number N2 selected by the electronic tag; and a message integrity check code MIC1 calculated by the reader-writer and having the value H (N2||Key);

the electronic tag is adapted to authenticate the access authentication request packet after receiving the access authentication request packet sent from the reader-writer, and build the access authentication response packet if the authentication succeeds, and send to the reader-writer the access authentication response packet; and authenticate the received access authentication confirmation packet sent from the reader-writer, wherein the access authentication response packet includes: the temporary identity TempID of the electronic tag; the random number N1 selected by the reader-writer; the random number N2 selected by the electronic tag; and the message integrity check code MIC calculated by the electronic tag and having the value H (TempID||N1||N2||Key).

The authentication function of the reader-writer may be carried out by a back-end server instead.

As can be seen from the technical solutions above, the reader-writer sends to the electronic tag an access authentication request packet; authenticates an access authentication response packet after receiving the access authentication response packet sent from the electronic tag, and builds an access authentication confirmation packet if the authentication succeeds; and sends to the electronic tag the access authentication confirmation packet. Therefore, authentication of electronic tag information and permission authorization are realized, guaranteeing the security of the electronic tag data information. Moreover, the electronic tag authenticates the access authentication request packet after receiving the access authentication request packet sent from the reader-writer, and builds the access authentication response packet if the authentication succeeds, and sends to the reader-writer the access authentication response packet; and authenticates the received access authentication confirmation packet sent from the reader-writer. Therefore, two-way authentication and permission authorization between the electronic tag and the reader-writer are realized, guaranteeing the security of the electronic tag data information. That is, shared-key updating between the electronic tag and the reader-writer is no longer needed, which improves protocol efficiency without deteriorating the security of the system. A more safe and reliable message integrity check technique is used so that active attacks can be prevented. Frequent shared-key writing is no longer needed, which saves the energy of the system and improves the usability of the electronic tag. The electronic tag and the reader-writer no longer need to save each calculation of message integrity check information, which lessens the burden on system storage.

DETAILED DESCRIPTION OF THE EMBODIMENTS

For a better understanding by the skilled in the art, terms used in the specification are described hereinafter:

R: reader-writer;

T: electronic tag;

ID: identity of the electronic tag;

TempID: temporary identity of the electronic tag used in the authentication process;

LastTempID: temporary identity of the electronic tag used in the last authentication process;

Key: pre-shared key shared between the reader-writer and the electronic tag;

PData: private information data of the electronic tag, e.g., data that need to be kept as a secret such as price and place of origin of a product;

H (x): one-way hash function;

N1: random number selected by the reader-writer;

N2: random number selected by the electronic tag;

SKey: session key.

Figure 1A:
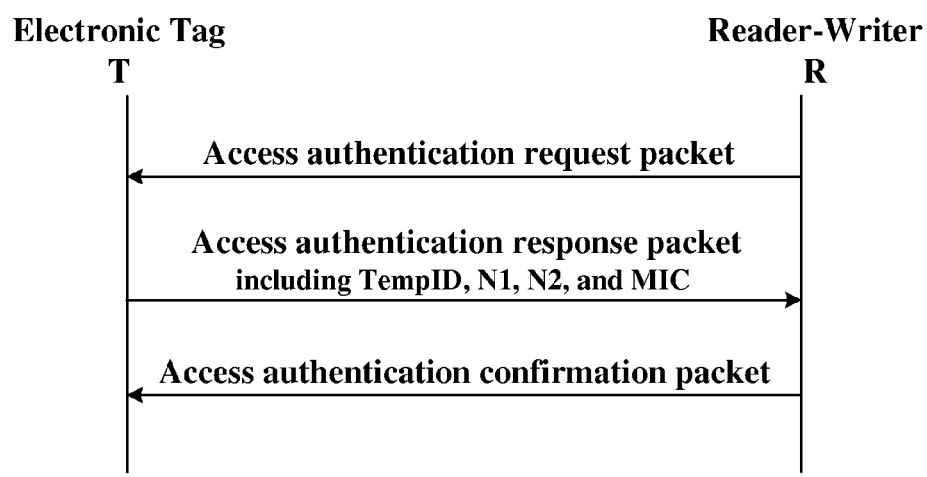
FIG. 1A illustrates a flow chart of a pre-shared key based anonymous authentication method provided by the invention.
Figure 1B:
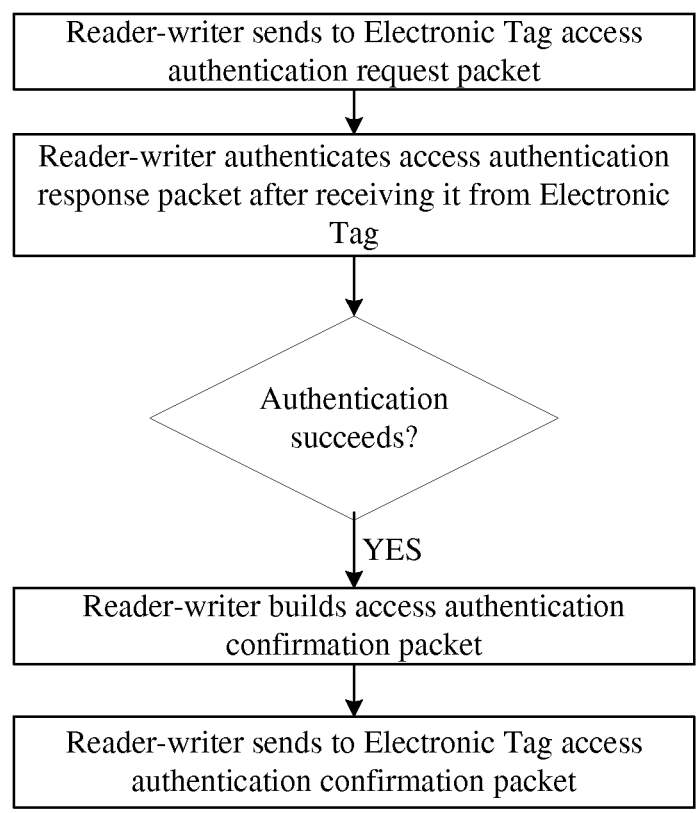
FIG. 1B is a flowchart of an authentication method provided by the invention.
Figure 2:
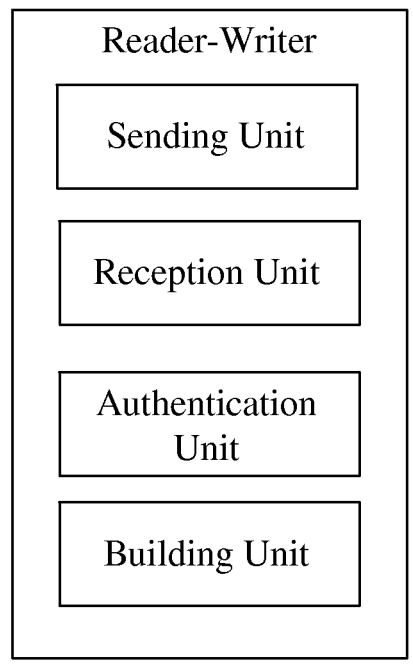
FIG. 2 is a block diagram of a reader-writer provided by the invention.
Figure 3:
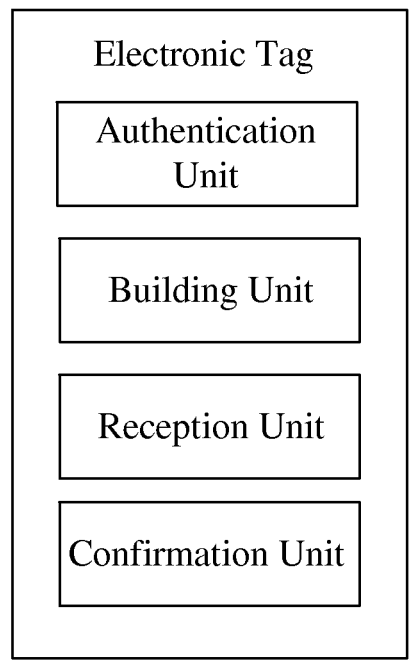
FIG. 3 is a block diagram of an electronic tag provided by the invention.

As shown in FIG. 1A, a flow chart of a pre-shared key based anonymous authentication method according to the invention, the method includes:

1) Firstly, the step of system parameter initialization is performed, i.e., the reader-writer generates system parameters, and corresponding processing processes are performed, which includes sending the system parameters to the electronic tag. This step is optional, and is not shown in the FIGURE. The initialized system parameters include:

Electronic tag T: an identity ID of the electronic tag, a pre-shared key Key and a temporary identity TempID of the electronic tag. TempID is initialized as: TempID=H (ID||Key);

Reader-writer R: all information of the electronic tag including: TempID, LastTempID, ID, Key and PData. TempID is initialized as: TempID=H (ID||Key), and LastTempID is initialized as: LastTempID=TempID.

This step is to set up system parameters for first use, and is not necessary in subsequent uses.

2) The reader-writer R sends to the electronic tag T an access authentication request packet. The access authentication request packet includes:

| N1 |
|----| where:

N1 field: random number selected by the reader-writer R.

3) The electronic tag builds an access authentication response packet after receiving the access authentication request packet, and sends it to the reader-writer R. The access authentication response packet includes:

| TempID | N1 | N2 | MIC |
|--------|----|----|-----| where:

TempID field: temporary identity of the electronic tag T;

N1 field: random number selected by the reader-writer R;

N2 field: random number selected by the electronic tag T;

MIC field: message integrity check code calculated by the electronic tag T and having the value H (TempID||N1||N2||Key).

4) The reader-writer R builds an access authentication confirmation packet after receiving the access authentication response packet, and sends it to the electronic tag T.

On receipt of the access authentication response packet, the reader-writer R first determines whether N1 is the random number selected by itself, if not, then discards the packet; and if so, then recalculates MIC and compares its value with the received MIC, if they are not equal, then discards the packet; and if they are equal, then starts to search a back-end database, if a temporary identity TempID of some electronic tag that equals to the received TempID is found, then let LastTempID=TempID and TempID=H (ID||Key||N1||N2), and builds the access authentication confirmation packet and sends it to the electronic tag T; and if a temporary identity TempID of some electronic tag that equals to the received TempID cannot be found, then searches whether LastTempID from the last authentication that equals to the received TempID exists, if LastTempID that equals to the received TempID is found, then let TempID=H (ID||Key||N1||N2), and builds the access authentication confirmation packet and sends it to the electronic tag T; otherwise, the reader-writer R ends its authentication, and the authentication process fails.

The access authentication confirmation packet includes:

| N2 | MIC1 |
|----|------| where:

N2 field: random number selected by the electronic tag T;

MIC1 field: message integrity check code calculated by the reader-writer R and having the value H (N2||Key).

5) The electronic tag T confirms according to the access authentication confirmation packet.

On receipt of the access authentication confirmation packet, the electronic tag T determines whether N2 is the random number selected by itself, if not, then discards the packet; if so, then recalculates MIC1 and compares its value with the received MIC1, if they are not equal, then discards the packet; and if they are equal, then let TempID=H (ID||Key||N1||N2) and determines the authentication succeeds.

By the protocol above, two-way authentication between the electronic tag T and the reader-writer R is realized, without leaking the identity information of the electronic tag T. During the authentication, the temporary identity TempID of the electronic tag T is updated.

Following successful authentication, the electronic tag T and the reader-writer R can generate the same session key SKey using the key Key, and the random numbers N1 and N2 respectively, and encrypt the private information data PData of the electronic tag using SKey, to protect tag data.

In addition, it should be noted that, although the embodiment above is described with the electronic tag T and the reader-writer R, the entity for the authentication function of the reader-writer R of the authentication process may reside on a back-end server.

Based on the implementation of the method above, the invention provides a reader-writer, including a sending unit, a reception unit, an authentication unit and a building unit. The sending unit is adapted to send to an electronic tag an access authentication request packet, wherein the access authentication request packet includes: a random number N1 selected by the reader-writer. The reception unit is adapted to receive an access authentication response packet sent from the electronic tag, wherein the access authentication response packet includes: a temporary identity TempID of the electronic tag; the random number N1 selected by the reader-writer; a random number N2 selected by the electronic tag; and a message integrity check code MIC calculated by the electronic tag and having the value H (TempID||N1||N2||Key). The authentication unit is adapted to authenticate the access authentication response packet received by the reception unit, and send an authentication success result. The building unit is adapted to build an access authentication confirmation packet on receipt of the authentication success result, and send to the electronic tag the access authentication confirmation packet.

Preferably, the reader-writer further includes: a setting-up unit, adapted to set up system parameters for the electronic tag, and initialize the system parameters and send the system parameters to the electronic tag which stores the system parameters.

Preferably, the authentication unit includes: a determination unit, a comparing unit, a search unit and a building unit. The determination unit is adapted to determine whether N1 is the random number selected by itself, and send a positive determination result. The comparing unit is adapted to, on receipt of the positive determination result sent from the determination unit, recalculate MIC and compares its value with the received MIC, and send a result indicating they are equal. The search unit is adapted to, on receipt of the result indicating they are equal, if can find a temporary identity TempID of the electronic tag that equals to the received TempID, then let LastTempID=TempID and TempID=H (ID||Key||N1||N2), and send an authentication success result. The building unit is adapted to, on receipt of the authentication success result, build the access authentication confirmation packet and send to the electronic tag the access authentication confirmation packet.

Based on the implementation of the method above, the invention provides an electronic tag, including: an authentication unit, a building unit, a reception unit and a confirmation unit. The authentication unit is adapted to receive an access authentication request packet sent from a reader-writer, authenticate the access authentication request packet, and send an authentication success message. The building unit is adapted to, on receipt of the authentication success message sent from the authentication unit, build an access authentication response packet, and send to the reader-writer the access authentication response packet. The reception unit is adapted to receive an access authentication confirmation packet sent from the reader-writer, wherein the access authentication confirmation packet includes: a random number N2 selected by the electronic tag; and a message integrity check code MIC1 calculated by the reader-writer and having the value H (N2∥Key). The confirmation unit is adapted to confirm the access authentication confirmation packet received by the reception unit.

Preferably, the electronic tag further includes: a storage unit, adapted to store in advance received system parameters sent from the reader-writer.

Preferably, the confirmation unit includes: a determination unit, a comparing unit and a confirmation unit. The determination unit is adapted to determine whether N2 is the random number selected by itself, and send a positive determination result. The comparing unit is adapted to, on receipt of the positive determination result, recalculate MIC1 and compares its value with the received MIC1, and send a result indicating they are equal. The confirmation unit is adapted to, on receipt of the result indicating they are equal, let TempID=H (ID∥Key∥N1∥N2) and determines the authentication succeeds.

Based on the implementation of the method above, the invention provides a pre-shared key based two-way anonymous authentication system, including a reader-writer and an electronic tag. The reader-writer is adapted to send to the electronic tag an access authentication request packet, wherein the access authentication request packet includes: a random number N1 selected by the reader-writer; authenticate an access authentication response packet after receiving the access authentication response packet sent from the electronic tag, and build an access authentication confirmation packet if the authentication succeeds; and send to the electronic tag the access authentication confirmation packet, wherein the access authentication confirmation packet includes: a random number N2 selected by the electronic tag; and a message integrity check code MIC1 calculated by the reader-writer and having the value H (N2∥Key).

the electronic tag is adapted to authenticate the access authentication request packet after receiving the access authentication request packet sent from the reader-writer, and build the access authentication response packet if the authentication succeeds, and send to the reader-writer the access authentication response packet; and authenticate the received access authentication confirmation packet sent from the reader-writer, wherein the access authentication response packet includes: the temporary identity TempID of the electronic tag; the random number N1 selected by the reader-writer; the random number N2 selected by the electronic tag; and the message integrity check code MIC calculated by the electronic tag and having the value H (TempID∥N1∥N2∥Key).

Please refer to corresponding processes in the method above for the function and operation of each device or entity in the system, which are omitted here.

According to the description of the embodiments described above, those skilled in the art understand that the present invention may be implemented with software plus necessary general-purpose hardware platform, or with hardware.

However, the former is preferred in many cases. Therefore, the technical solutions of the invention essentially, or the contribution of the invention, can be carried out in the form of a software product. The computer software product can be stored in a storage medium, e.g., ROM/RAM, magnetic disk, or optical disc, and includes several instructions that causes a computer device (e.g., personal computer, server or network device) to execute a method according to an embodiment or part of an embodiment of the invention.

Preferred embodiments of the invention are described above. It should be noted that various alternations and modifications can be made by those skilled in the art without departing from the scope of the invention. Those alternations and modifications should be included in the scope of the invention.

The invention claimed is:

1. A pre-shared key based anonymous authentication method, comprising:
   sending, by a reader-writer to an electronic tag, an access authentication request packet, wherein the access authentication request packet comprises: a random number N1 selected by the reader-writer;
   authenticating, by the reader-writer, an access authentication response packet after receiving the access authentication response packet sent from the electronic tag, and building an access authentication confirmation packet if the authentication succeeds, wherein the access authentication response packet comprises: a temporary identity TempID of the electronic tag; the random number N1 selected by the reader-writer; a random number N2 selected by the electronic tag; and a message integrity check code MIC calculated by the electronic tag and having the value H (TempID∥N1∥N2∥Key);
   sending, by the reader-writer to the electronic tag, the access authentication confirmation packet.

2. The pre-shared key based anonymous authentication method according to claim 1, further comprising:
   authenticating, by the electronic tag, the access authentication request packet after receiving the access authentication request packet sent from the reader-writer, and building the access authentication response packet if the authentication succeeds, wherein the access authentication confirmation packet comprises: a random number N2 selected by the electronic tag; and a message integrity check code MIC1 calculated by the reader-writer and having the value H (N2∥Key);
   sending, by the electronic tag to the reader-writer, the access authentication response packet;
   confirming, by the electronic tag, the received access authentication confirmation packet sent from the reader-writer.

3. The pre-shared key based anonymous authentication method according to claim 2, wherein the method further comprises, before the reader-writer sends to the electronic tag the access authentication request packet:
   setting up, by the reader-writer, system parameters for the electronic tag, and initializing the system parameters and sending the system parameters to the electronic tag which stores the system parameters.

4. The pre-shared key based anonymous authentication method according to claim 3, wherein:
   system parameters stored in the electronic tag comprises: an identity ID of the electronic tag, the pre-shared key Key and the temporary identity TempID of the electronic tag, and TempID is initialized as: TempID=H (ID∥Key);
   system parameters stored in the reader-writer comprises: all information of the electronic tag comprising: TempID, a temporary identity LastTempID of the electronic tag from the last authentication, ID, Key and private information data PData of the electronic tag, and TempID is initialized as: TempID=H (ID∥Key) and LastTempID is initialized as: LastTempID=TempID.

5. The pre-shared key based anonymous authentication method according to claim 1, wherein the authenticating of the access authentication response packet and the building of the access authentication confirmation packet if the authentication succeeds comprise:

if the reader-writer determines that N1 is the random number selected by itself, then recalculates MIC and compares its value with the received MIC, if they are equal, then searches a back-end database, if a temporary identity TempID of the electronic tag that equals to the received TempID is found, then let LastTempID=TempID and TempID=H (ID∥Key∥N1∥N2), determines that the authentication succeeds, builds the access authentication confirmation packet and sends it to the electronic tag; and if a temporary identity TempID of some electronic tag that equals to the received TempID cannot be found, then continues to search whether some LastTempID that equals to the received TempID exists, if LastTempID of some electronic tag that equals to the received TempID is found, then let TempID=H (ID∥Key∥N1∥N2), determines that the authentication succeeds, builds the access authentication confirmation packet and sends it to the electronic tag.

6. The pre-shared key based anonymous authentication method according to claim 5, wherein the authenticating of the access authentication request packet and the building of the access authentication response packet if the authentication succeeds comprise:

if the electronic tag determines that N2 is the random number selected by itself, then recalculates MIC1 and compares its value with the received MIC1, if they are equal, then let TempID=H (ID∥Key∥N1∥N2) and determines the authentication succeeds.

7. The pre-shared key based anonymous authentication method according to claim 1, wherein the authentication function of the reader-writer is carried out by a back-end server instead.

8. A reader-writer, comprising:

a sending unit, adapted to send to an electronic tag an access authentication request packet, wherein the access authentication request packet comprises: a random number N1 selected by the reader-writer;

a reception unit, adapted to receive an access authentication response packet sent from the electronic tag, wherein the access authentication response packet comprises: a temporary identity TempID of the electronic tag; the random number N1 selected by the reader-writer; a random number N2 selected by the electronic tag; and a message integrity check code MIC calculated by the electronic tag and having the value H (TempID∥N1∥N2∥Key);

an authentication unit, adapted to authenticate the access authentication response packet received by the reception unit, and send an authentication success result;

a building unit, adapted to build an access authentication confirmation packet on receipt of the authentication success result, and send to the electronic tag the access authentication confirmation packet.

9. The reader-writer according to claim 8, further comprising:

a setting-up unit, adapted to set up system parameters for the electronic tag, and initialize the system parameters and send the system parameters to the electronic tag which stores the system parameters.

10. The reader-writer according to claim 8, wherein the authentication unit comprises:

a determination unit, adapted to determine whether N1 is the random number selected by itself, and send a positive determination result;

a comparing unit, adapted to, on receipt of the positive determination result sent from the determination unit, recalculate MIC and compares its value with the received MIC, and send a result indicating they are equal;

a search unit, adapted to, on receipt of the result indicating they are equal, if can find a temporary identity TempID of the electronic tag that equals to the received TempID, then let LastTempID=TempID and TempID=H (ID∥Key∥N1∥N2), and send an authentication success result;

a building unit, adapted to, on receipt of the authentication success result, build the access authentication confirmation packet and send to the electronic tag the access authentication confirmation packet.

11. An electronic tag, comprising:

an authentication unit, adapted to receive an access authentication request packet sent from a reader-writer, authenticate the access authentication request packet, and send an authentication success message;

a building unit, adapted to, on receipt of the authentication success message sent from the authentication unit, build an access authentication response packet, and send to the reader-writer the access authentication response packet;

a reception unit, adapted to receive an access authentication confirmation packet sent from the reader-writer, wherein the access authentication confirmation packet comprises: a random number N2 selected by the electronic tag; and a message integrity check code MIC1 calculated by the reader-writer and having the value H (N2∥Key);

a confirmation unit, adapted to confirm the access authentication confirmation packet received by the reception unit.

12. The electronic tag according to claim 11, further comprising:

a storage unit, adapted to store in advance received system parameters sent from the reader-writer.

13. The electronic tag according to claim 11, wherein the confirmation unit comprises:

a determination unit, adapted to determine whether N2 is the random number selected by itself, and send a positive determination result;

a comparing unit, adapted to, on receipt of the positive determination result, recalculate MIC1 and compares its value with the received MIC1, and send a result indicating they are equal;

a confirmation unit, adapted to, on receipt of the result indicating they are equal, let TempID=H (ID∥Key∥N1∥N2) and determines the authentication succeeds.

14. The pre-shared key based anonymous authentication method according to claim 2, wherein the authenticating of the access authentication response packet and the building of the access authentication confirmation packet if the authentication succeeds comprise:

if the reader-writer determines that N1 is the random number selected by itself, then recalculates MIC and compares its value with the received MIC, if they are equal, then searches a back-end database, if a temporary identity TempID of the electronic tag that equals to the received TempID is found, then let LastTempID=TempID and TempID=H (ID||Key||N1||N2), determines that the authentication succeeds, builds the access authentication confirmation packet and sends it to the electronic tag; and if a temporary identity TempID of some electronic tag that equals to the received TempID cannot be found, then continues to search whether some LastTempID that equals to the received TempID exists, if LastTempID of some electronic tag that equals to the received TempID is found, then let TempID=H (ID||Key||N1||N2), determines that the authentication succeeds, builds the access authentication confirmation packet and sends it to the electronic tag.

15. The pre-shared key based anonymous authentication method according to claim 3, wherein the authenticating of the access authentication response packet and the building of the access authentication confirmation packet if the authentication succeeds comprise:
if the reader-writer determines that N1 is the random number selected by itself, then recalculates MIC and compares its value with the received MIC, if they are equal, then searches a back-end database, if a temporary identity TempID of the electronic tag that equals to the received TempID is found, then let LastTempID=TempID and TempID=H (ID||Key||N1||N2), determines that the authentication succeeds, builds the access authentication confirmation packet and sends it to the electronic tag; and if a temporary identity TempID of some electronic tag that equals to the received TempID cannot be found, then continues to search whether some LastTempID that equals to the received TempID exists, if LastTempID of some electronic tag that equals to the received TempID is found, then let TempID=H (ID||Key||N1||N2), determines that the authentication succeeds, builds the access authentication confirmation packet and sends it to the electronic tag.

16. The pre-shared key based anonymous authentication method according to claim 4, wherein the authenticating of the access authentication response packet and the building of the access authentication confirmation packet if the authentication succeeds comprise:
if the reader-writer determines that N1 is the random number selected by itself, then recalculates MIC and compares its value with the received MIC, if they are equal, then searches a back-end database, if a temporary identity TempID of the electronic tag that equals to the received TempID is found, then let LastTempID=TempID and TempID=H (ID||Key||N1||N2), determines that the authentication succeeds, builds the access authentication confirmation packet and sends it to the electronic tag; and if a temporary identity TempID of some electronic tag that equals to the received TempID cannot be found, then continues to search whether some LastTempID that equals to the received TempID exists, if LastTempID of some electronic tag that equals to the received TempID is found, then let TempID=H (ID||Key||N1||N2), determines that the authentication succeeds, builds the access authentication confirmation packet and sends it to the electronic tag.

17. The pre-shared key based anonymous authentication method according to claim 14, wherein the authenticating of the access authentication request packet and the building of the access authentication response packet if the authentication succeeds comprise:
if the electronic tag determines that N2 is the random number selected by itself, then recalculates MIC1 and compares its value with the received MIC1, if they are equal, then let TempID=H (ID||Key||N1||N2) and determines the authentication succeeds.

18. The pre-shared key based anonymous authentication method according to claim 16, wherein the authenticating of the access authentication request packet and the building of the access authentication response packet if the authentication succeeds comprise:
if, the electronic tag determines that N2 is the random number selected by itself, then recalculates MIC1 and compares its value with the received MIC1, if they are equal, then let TempID=H (ID||Key||N1||N2) and determines the authentication succeeds.

19. The reader-writer according to claim 9, wherein the authentication unit comprises:
a determination unit, adapted to determine whether N1 is the random number selected by itself, and send a positive determination result;
a comparing unit, adapted to, on receipt of the positive determination result sent from the determination unit, recalculate MIC and compares its value with the received MIC, and send a result indicating they are equal;
a search unit, adapted to, on receipt of the result indicating they are equal, if can find a temporary identity TempID of the electronic tag that equals to the received TempID, then let LastTempID=TempID and TempID=H (ID||Key||N1||N2), and send an authentication success result;
a building unit, adapted to, on receipt of the authentication success result, build the access authentication confirmation packet and send to the electronic tag the access authentication confirmation packet.

20. The electronic tag according to claim 12, wherein the confirmation unit comprises:
a determination unit, adapted to determine whether N2 is the random number selected by itself, and send a positive determination result;
a comparing unit, adapted to, on receipt of the positive determination result, recalculate MIC1 and compares its value with the received MIC1, and send a result indicating they are equal;
a confirmation unit, adapted to, on receipt of the result indicating they are equal, let TempID=H (ID||Key||N1||N2) and determines the authentication succeeds.

* * * * *